United States Patent
Ma et al.

(10) Patent No.: US 12,161,140 B2
(45) Date of Patent: Dec. 10, 2024

(54) **METHOD FOR PREPARING FOOD FUMEOL, METHOD FOR PREPARING FOOD FUMEOL FROM *Perilla frutescens* AS RAW MATERIAL AND APPLICATION**

(71) Applicant: Henan Shuanghui Investment Development Co., Ltd., Henan (CN)

(72) Inventors: Xiangjie Ma, Henan (CN); Shaohua Meng, Henan (CN); Jiansheng Zhao, Henan (CN); Xianqing Huang, Henan (CN); Hua Xie, Henan (CN); Yonglin Wang, Henan (CN); Lingjian Wang, Henan (CN); Jixiang Shan, Henan (CN); Peiyang Meng, Henan (CN); Wenguang Tian, Henan (CN); Guanyong Liu, Henan (CN); Tianxi Wang, Henan (CN); Xiaoli Liu, Henan (CN); Jingjing Chen, Henan (CN); Shuan Qin, Henan (CN)

(73) Assignee: Henan Shuanghui Investment Development Co., Ltd., Henan (CN)

( * ) Notice: Subject to any disclaimer, the term of this patent is extended or adjusted under 35 U.S.C. 154(b) by 106 days.

(21) Appl. No.: 17/356,118

(22) Filed: Jun. 23, 2021

(65) Prior Publication Data
US 2022/0192243 A1 Jun. 23, 2022

(30) Foreign Application Priority Data
Dec. 23, 2020 (CN) .......................... 202011546322.8
Dec. 23, 2020 (CN) .......................... 202011546323.2

(51) Int. Cl.
*A23L 27/10* (2016.01)
(52) U.S. Cl.
CPC .................................. *A23L 27/115* (2016.08)
(58) Field of Classification Search
CPC .................................................. A23L 27/115
See application file for complete search history.

(56) References Cited

FOREIGN PATENT DOCUMENTS

| CN | 101785574 A | * | 7/2010 |
|---|---|---|---|
| CN | 102342389 | | 2/2012 |
| CN | 102028233 B | * | 10/2012 |
| CN | 104856187 | | 8/2015 |
| CN | 106213244 | | 12/2016 |
| CN | 106578997 A | * | 4/2017 |
| CN | 107279779 | | 10/2017 |
| CN | 110463893 | | 11/2019 |
| CN | 110477289 | | 11/2019 |
| CN | 111053103 | | 4/2020 |
| EP | 0089160 A2 | * | 4/1983 |

OTHER PUBLICATIONS

Kornegay J, Feast and Field, "In a nutshell: Different nut types, explained," Dec. 6, 2021, Obtained from the Internet Nov. 17, 2022 <https://feastandfield.net/read/grains-legumes-nuts/in-a-nutshell-different-nut-types-explained> (Year: 2021).*
US Dept of Agriculture, "Hardwood-Distillation Industry," Feb. 1956. (Year: 1956).*
S Maulina and F Silia 2018 IOP Conf. Ser.: Mater. Sci. Eng. 309 012073 (Year: 2018).*
Farida Ali and Roval Al Fiqri 2020 J. Phys.: Conf. Ser. 1500 012064 (Year: 2020).*
Westlab, "Difference in Quantitative and Qualitative Filter Papers," Mar. 7, 2019, Retrieved from the Internet <https://www.westlab.com/blog/2019/03/07/difference-in-quantitative-and-qualitative-filter-papers> (Year: 2019).*
First Chinese Office Action, issued in the corresponding Chinese patent application No. 202011546323.2, dated Apr. 15, 2022 (10 pages with machine translation).
Chinese Search Report, issued in the corresponding Chinese patent application No. 202011546323.2, dated Apr. 8, 2022, 1 page.
First Chinese Office Action, issued in the corresponding Chinese patent application No. 202011546322.8, dated Apr. 15, 2022 (12 pages with machine translation).
Second Chinese Office Action, issued in the corresponding Chinese patent application No. 202011546322.8, dated Sep. 22, 2022 (14 pages with machine translation).
Chinese Search Report, issued in the corresponding Chinese patent application No. 202011546322.8, dated Apr. 8, 2022, 1 page.

* cited by examiner

*Primary Examiner* — Donald R Spamer
*Assistant Examiner* — Jeffrey D Benson
(74) *Attorney, Agent, or Firm* — HSML P.C.

(57) ABSTRACT

The present invention provides a method for preparing a food fumeol, a method for preparing a food fumeol from *Perilla frutescens* as a raw material and application. The method for preparing a food fumeol includes: respectively preparing a single fumeol from each of n raw materials; and then, mixing at least two kinds of single fumeols to prepare the food fumeol, wherein n is a positive integer being greater than or equal to 2. According to application of the food fumeol, food is liquid smoked by using the food fumeol of the present application. The types and flavors of the food fumeol are greatly enriched, and the development of the food fumeol of different types and flavors is facilitated. A *Perilla frutescens* fumeol having a natural unique flavor prepared by the method for preparing the food fumeol from *Perilla frutescens* as the raw material contains rich flavor substances, and achieves antibacterial and antioxidant effects. By using the *Perilla frutescens* fumeol for liquid smoking, the smoking speed is high, the operation is convenient, and a product has intense smoking aromas, a unique natural flavor and no or few harmful substances.

2 Claims, No Drawings

METHOD FOR PREPARING FOOD FUMEOL, METHOD FOR PREPARING FOOD FUMEOL FROM *Perilla frutescens* AS RAW MATERIAL AND APPLICATION

FIELD OF TECHNOLOGY

The present invention relates to food fumeols, in particular to a method for preparing a food fumeol, a method for preparing a food fumeol from *Perilla frutescens* as a raw material and application.

BACKGROUND

With the improvement of people's health awareness, higher requirements on food safety are put forward. Although the traditional smoked food is delicious, it is gradually rejected by people because some harmful substances are generated in the smoking process. Moreover, existing fumeols for food are few in types, and need to be developed urgently.

SUMMARY

In order to solve the above problems, the present invention provides a method for preparing a food fumeol, a method for preparing a food fumeol from *Perilla frutescens* as a raw material and application. The types and flavors of the food fumeols are greatly enriched, and the development of the food fumeols of different types and flavors is facilitated.

A method for preparing a food fumeol includes: respectively preparing a single fumeol from each of n raw materials, and then, mixing at least two kinds of single fumeols to prepare the food fumeol, wherein n is a positive integer being greater than or equal to 2.

A method for preparing each of the raw materials into a single fumeol includes performing dry distillation on the raw materials at a temperature of 250° C. to 350° C., then, condensing smoke gas, collecting a crude fumeol, performing low-temperature still standing on the crude fumeol for 24 to 48 h in a refrigerator being 0° C. to 4° C., and performing filtration.

The raw materials are raw materials without mildew, dust or other impurities, are subjected to pulverization treatment, and are put into a blast air oven being 105° C. to be repeatedly dried to reach a constant weight, the constant weight refers to a condition that a difference between two successive weighing results is less than 1 g, and then, dry particles with a particle size being 0.8 mm are obtained.

The raw materials are able to be wood raw materials, such as nontoxic seeds, stems, fruits and roots of a plant with unique aromas, and are specifically able to be fruitwood, fruit peel, fruit kernels, cypresses, *Perilla frutescens*, garlics, garlic stems, orange peel, apple peel, apple cores, jujube pits, etc.

The raw materials are pulverized into dry particles with a particle size of 0.2 mm to 1.5 mm, and then dry distillation is performed.

The raw materials are pulverized into dry particles with a particle size of 0.8 mm, and then dry distillation is performed.

The filtration is performed twice by using quantitative filter paper.

The dry distillation time of the raw materials is 50 min.

A method for preparing a food fumeol from *Perilla frutescens* as a raw material includes using *Perilla frutescens* as a raw material, performing dry distillation at a temperature of 250° C. to 350° C., then, condensing smoke gas, collecting a crude fumeol, performing low-temperature still standing on the crude fumeol for 24 to 48 h in a refrigerator being 0° C. to 4° C., and then, performing filtration, wherein the *Perilla frutescens* is pulverized into dry particles with a particle size of 0.2 mm to 1.5 mm, and then dry distillation is performed; the *Perilla frutescens* is pulverized into dry particles with a particle size of 0.8 mm, and then dry distillation is performed; filtration is performed by using double-layer quantitative filter paper; used *Perilla frutescens* is a raw material without mildew, dust or other impurities, is subjected to pulverization treatment, and is put into a blast air oven being 105° C. to be repeatedly dried to reach a constant weight, a condition that a difference between two successive weighing results is less than 1 g is regarded as the constant weight, and then, dry particles with a particle size being 0.8 mm are obtained, wherein the dry distillation time of the *Perilla frutescens* is 50 min.

According to application of a food fumeol prepared by the preparation method, food is liquid smoked by using the food fumeol of the present application.

Compared with the prior art, the method for preparing food fumeol provided by the present invention is characterized in that a single fumeol is respectively prepared from each of n raw materials, and then, different single fumeols are mixed to prepare the food fumeol, so that the food fumeol having different special flavors and colors and containing no or few harmful substances is prepared according to different flavors and colors of each of the prepared and added single fumeols and different consumption of each of the single fumeols. The types, colors and flavors of the food fumeols are greatly enriched by the method provided by the present application, and the development of the food fumeols of different types, colors and flavors is facilitated. A *Perilla frutescens* fumeol having a natural unique flavor prepared by the method for preparing the food fumeol from *Perilla frutescens* as the raw material contains rich flavor substances, and achieves antibacterial and antioxidant effects. By using the *Perilla frutescens* fumeol for liquid smoking, the smoking speed is high, the operation is convenient, and a product has intense smoking aromas, a unique natural flavor and no or few harmful substances.

DETAILED DESCRIPTION OF THE EMBODIMENTS

A method for preparing a food fumeol includes: a single fumeol is respectively prepared from each of n raw materials, then, at least two kinds of single fumeols are mixed to prepare the food fumeol, and n is a positive integer being greater than or equal to 2.

A method for preparing each of the raw materials into a single fumeol includes: dry distillation is performed on the raw materials at a temperature of 250° C. to 350° C., then, smoke gas is condensed, a crude fumeol is collected, and is subjected to low-temperature still standing for 24 to 48 h in a refrigerator being 0° C. to 4° C., and filtration is performed.

The raw materials are raw materials without mildew, dust or other impurities, are subjected to pulverization treatment, and are put into a blast air oven being 105° C. to be repeatedly dried to reach a constant weight, the constant weight refers to a condition that a difference between two successive weighing results is less than 1 g, and then, dry particles with a particle size being 0.8 mm are obtained.

The raw materials are able to be wood raw materials, such as nontoxic seeds, stems, fruits and roots of a plant with unique aromas, and are specifically able to be fruitwood, fruit peel, fruit kernels, cypresses, *Perilla frutescens*, garlics, garlic stems, orange peel, apple peel, apple cores, jujube pits, etc.

The raw materials are pulverized into dry particles with a particle size of 0.2 mm to 1.5 mm, and then dry distillation is performed.

The raw materials are pulverized into dry particles with a particle size of 0.8 mm, and then dry distillation is performed.

The filtration is performed twice by using quantitative filter paper.

The dry distillation time of the raw materials is 50 min.

According to application of the food fumeol, food is liquid smoked by using the food fumeol of the present application.

Compared with the prior art, the method for preparing a food fumeol provided by the present invention is characterized in that a single fumeol is respectively prepared from each of n raw materials, and then, different single fumeols is mixed to prepare the food fumeol, so that the food fumeol having different special flavors and containing no or few harmful substances is prepared according to different flavors of each of the prepared and added single fumeols and different consumption of each of the single fumeols. The types and flavors of the food fumeols are greatly enriched by the method provided by the present application, and the development of the food fumeols of different types and flavors is facilitated.

The technical solution of the present invention will be described clearly and completely hereinafter in conjunction with specific embodiments, it should be understood that the exemplary embodiments described herein are illustrative and explanatory only and shall not be understood as the limitation to the protection scope of the present invention, and those skilled in the art may make some non-essential improvements and adjustments according to the following contents of the present invention. In the present invention, unless clearly specified and defined otherwise, technical terms used herein shall have the ordinary meaning understood by those skilled in the art to which the present invention belongs.

I. Preparation of Food Fumeol from Single Raw Material

1. Technical flow process of preparing food fumeol from single raw material

Raw material pulverization, drying, sieving grading, weighing, pyrolysis and condensation, crude fumeol collection, low-temperature still standing, filtration, and fumeol refining 2. A method for preparing a food fumeol from a single raw material, including the following steps:

(1) A raw material without mildew, dust or other impurities was selected, was subjected to pulverization treatment by using a swinging type high-speed traditional Chinese medicine pulverization machine, and was then put into a stainless steel tray to be repeatedly dried in a blast air oven being 105° C. to reach a constant weight. The constant weight referred to a condition that a difference between two successive weighing results was less than 1 g. Additionally, a thickness of the raw material did not exceed 2 cm, and the thickness of 2 cm herein referred to a raw material laying thickness during drying, was mainly for the purpose of facilitating drying, and was determined according to drying equipment.

(2) The dried and pulverized raw material was screened, and particles with a particle size of 0.2 mm to 1.5 mm were taken.

(3) 30 g of the screened raw material was accurately weighed and placed into a three-neck flask, a thermocouple thermometer was inserted into an inclined opening for monitoring the temperature, a condensing and collecting device was well connected, a cooling water switch was opened, and a power supply switch was turned on for pyrolysis for the pyrolysis time of 50 min. After the pyrolysis was completed, a crude fumeol was immediately put into a refrigerator being 0° C. to 4° C. to be subjected to still standing for 24 to 48 h, so that impurities such as wood tar could be sufficiently separated from the fumeol. An ash content was at an upper layer, the wood tar was at a lower layer, and only a middle layer was reserved. At the same time, by putting the fumeol into the refrigerator, moisture in the fumeol could be prevented from being volatilized. Then, filtration was performed twice by using quantitative filter paper, and a single fumeol was obtained.

Specifically, the preparation of the single fumeol from the following raw materials is used as examples for illustration:

3. (1) A *Perilla frutescens* fumeol was prepared by the method in 2: the *Perilla frutescens* fumeol was brown yellow, the yield was 20 to 30%, and a density was 0.9 to 1.0 g/ml.

(2) Preparation of *Perilla frutescens* fumeol at different temperatures: during the preparation of *Perilla frutescens* fumeol at different temperatures, only the pyrolysis temperatures were different, and other conditions and steps were identical.

30 g±1 g of dry *Perilla frutescens* particles were taken and put into a high-temperature-resistant three-neck flask, heating was performed by a ZNHW type electric jacket, a middle opening of the three-neck flask was a smoke outlet, pyrolysis smoke entered a condensing system such as a condenser to be condensed from the smoke outlet, and after the condensation, collection was performed to obtain a crude fumeol. A thermocouple thermometer was inserted into a left opening to monitor the temperature of materials in real time. A right opening was tightly plugged by a plug. It should be noted that in the pyrolysis process, the sealing between the whole three-neck flask and a connecting opening was maintained. At the beginning of the pyrolysis, changes occurring in the flask in the pyrolysis process were observed. The pyrolysis time was 50 min. The particle size of the *Perilla frutescens* particles was 0.8 mm. The pyrolysis temperatures were respectively 250° C., 300° C. and 350° C. After the pyrolysis was completed, the crude fumeol was immediately put into a refrigerator being 4° C. to be subjected to still standing for 48 h, so that impurities such as wood tar could be sufficiently separated from the fumeol, and at the same time, by putting the fumeol into the refrigerator, moisture in the fumeol could be prevented from being volatilized. Then, filtration was performed twice by using quantitative filter paper, and a refined *Perilla frutescens* fumeol was obtained.

The refined *Perilla frutescens* fumeol prepared at different pyrolysis temperatures was put into a refrigerator being 4° C. to wait for detection. In the process that the refined *Perilla frutescens* fumeol was placed in the refrigerator, a small amount of precipitation was normal. A detection method adopted a detection method in *National Food Safety Standard GB* 1886.127-2016 *Food Additives Hawthorn Seed Smoking Spices No. I and No. II*. An amended Gibbs method was adopted for detecting a phenol content, and a result was expressed by 2,6-dimethoxyphenol.

A hydroxylamine hydrochloride method was adopted for determining a carbonyl compound. A principle was that a carbonyl group in the carbonyl compound could react with hydroxylamine hydrochloride to produce oxime and water and to release acid at the same time. The produced acid was titrated by 0.100 mol/L of a sodium hydroxide standard solution, and a content of the carbonyl compound could be obtained. Finally, the content of the carbonyl compound was expressed by heptanal.

The reference to a national standard GB 5009.27-2016 of *National Food Safety Standard of Determination of Benzo(a)pyrene in Food* was adopted for determining a content of benzopyrene.

The contents of the phenol, carbonyl compound and the benzopyrene in the *Perilla frutescens* fumeol prepared through pyrolysis at different temperatures were as shown in Table 1 below.

TABLE 1

Contents of each component of *perilla frutescens* fumeol prepared through pyrolysis at different temperatures

| Raw material | Temperature | Total phenol content (mg/mL) | Carbonyl compound content (g/100 mL) | Benzopyrene content (ug/kg) |
| --- | --- | --- | --- | --- |
| Perilla frutescens | 250° C. | 0.568 | Not detected | 0.26 |
| | 300° C. | 1.626 | Not detected | 0.32 |
| | 350° C. | 1.732 | Not detected | 0.33 |

In the *Perilla frutescens* fumeol provided by the present application, a carbonyl compound was not detected, the formation of brown substances in smoked food was reduced, the existence of phenol substances was ensured, the aroma and flavor substances in the fumeol were ensured, and additionally, sterilization, antiseptic and antioxidation effects were ensured.

4. (1) A dried tangerine peel fumeol was prepared by the method in 2: the dried tangerine peel fumeol was brown, the yield was 20 to 30%, and a density was about 0.9 to 1.0 g/ml.

(2) The dried tangerine peel fumeol was prepared under an aerobic condition:

30 g+/−1 g of raw materials were taken and put into a high-temperature-resistant three-neck flask, a middle opening of the three-neck flask was a smoke outlet, smoke produced during pyrolysis entered a condensing system such as a condenser to be condensed from the smoke outlet, and after the condensation, collection was performed to obtain a crude fumeol. A thermocouple thermometer was inserted into a left opening to monitor the temperature of materials in real time. A right opening was tightly plugged by a plug. A heating instrument was a ZNHW type electric jacket. The electric jacket was provided with a digital display screen, could fast raise the temperature to a set temperature, and could maintain the temperature for pyrolysis. It should be noted that in the pyrolysis process, the sealing between the whole three-neck flask and a connecting opening was maintained. Preparation conditions were as follows: a heating temperature was 300° C., the pyrolysis time was 50 min, and the particle size was 0.8 mm. After the pyrolysis was completed, the crude fumeol was immediately put into a refrigerator being 4° C. to be subjected to 1 still standing for 48 h, so that impurities such as wood tar could be sufficiently separated from the fumeol, and at the same time, by putting the fumeol into the refrigerator, moisture in the fumeol could be prevented from being volatilized. Then, filtration was performed twice by using quantitative filter paper, and a refined dried tangerine peel fumeol was obtained.

The prepared refined dried tangerine peel fumeol was put into a refrigerator being 4° C. to wait for detection. In the process that the refined dried tangerine peel fumeol was placed in the refrigerator, a small amount of precipitation was normal. A detection method adopted a detection method in *National Food Safety Standard GB* 1886.127-2016 *Food Additives Hawthorn Seed Smoking Spices No. I and No. II*. An amended Gibbs method was adopted for detecting a phenol content, and a result was expressed by 2,6-dimethoxyphenol.

A hydroxylamine hydrochloride method was adopted for determining a carbonyl compound. A principle was that a carbonyl group in the carbonyl compound could react with hydroxylamine hydrochloride to produce oxime and water and to release acid at the same time. The produced acid was titrated by 0.100 mol/L of a sodium hydroxide standard solution, and a content of the carbonyl compound could be obtained. Finally, the content of the carbonyl compound was expressed by heptanal.

The reference to a national standard GB 5009.27-2016 of *National Food Safety Standard of Determination of Benzo(a)pyrene in Food* was adopted for determining a content of benzopyrene.

Under the aerobic condition, a phenol content in the dried tangerine peel fumeol was 1.637 mg/mL, a carbonyl compound content was 10.847 g/100 mL, and a benzopyrene content was 0.33 (ug/kg).

(3) The dried tangerine peel fumeol was prepared under an anaerobic condition:

According to devices for preparing the dried tangerine peel fumeol under the aerobic condition, the dried tangerine peel was put into a pyrolysis device for pyrolysis. Nitrogen gas was introduced into a right opening of the three-neck flask to be used as shielding gas, so that a pyrolysis reactor of the three-neck flask is in a complete anaerobic state. Pyrolysis was performed under this condition, smoke produced during pyrolysis was condensed and collected to obtain a crude fumeol. Preparation conditions were as follows: a pyrolysis temperature was 350° C., the pyrolysis time was 50 min, and a particle size was 0.8 mm. After the pyrolysis was completed, the obtained crude fumeol was immediately put into a refrigerator being 4° C. to be subjected to still standing for 48 h, so that impurities such as wood tar could be sufficiently separated from the fumeol, and at the same time, by putting the fumeol into the refrigerator, moisture in the fumeol could be prevented from being volatilized. Then, filtration was performed twice by using quantitative filter paper, and refined dried tangerine peel fumeol was obtained.

The prepared refined dried tangerine peel fumeol was put into a refrigerator being 4° C. to wait for detection. In the process that the refined dried tangerine peel fumeol was placed in the refrigerator, a small amount of precipitation was normal. A detection method adopted a detection method in *National Food Safety Standard GB* 1886.127-2016 *Food Additives Hawthorn Seed Smoking Spices No. I and No. II*. An amended Gibbs method was adopted for detecting a phenol content, and a result was expressed by 2,6-dimethoxyphenol.

A hydroxylamine hydrochloride method was adopted for determining a carbonyl compound. A principle was that a carbonyl group in the carbonyl compound could react with hydroxylamine hydrochloride to produce oxime and water and to release acid at the same time. The produced acid was titrated by 0.100 mol/L of a sodium hydroxide standard solution, and a content of the carbonyl compound could be obtained. Finally, the content of the carbonyl compound was expressed by heptanal.

The reference to a national standard GB 5009.27-2016 of *National Food Safety Standard of Determination of Benzo (a)pyrene in Food* was adopted for determining a content of benzopyrene.

Under the anaerobic condition, a total phenol content in the dried tangerine peel fumeol was 1.45 mg/mL, a carbonyl compound content was 0.35 g/100 mL, and a benzopyrene content was 0.28 (ug/kg).

5. (1) A garlic stem fumeol was prepared by the method in 2: the garlic stem fumeol was brown yellow, the yield was 20 to 30%, and a density was 0.9 to 1.0 g/ml.

(2) Preparation of garlic stem fumeol at different temperatures:

30 g±1 g of raw materials with a particle size of 0.8 mm were taken and put into a high-temperature-resistant three-neck flask, and a heating instrument was a ZNHW type electric jacket. Garlic stems were respectively subjected to pyrolysis at temperatures of 250° C., 300° C. and 350° C., and smoke produced during pyrolysis was respectively condensed and collected to obtain a crude fumeol at different temperatures. The pyrolysis time was 50 min. After the pyrolysis was completed, the obtained crude fumeol was immediately put into a refrigerator being 4° C. to be subjected to still standing for 48 h, so that impurities such as wood tar could be sufficiently separated from the fumeol, and at the same time, by putting the fumeol into the refrigerator, moisture in the fumeol could be prevented from being volatilized. Then, filtration was performed twice by using quantitative filter paper, and a refined garlic stem fumeol was obtained.

The prepared refined garlic stem fumeol was put into a refrigerator being 4° C. to wait for detection. In the process that the refined garlic stem fumeol was placed in the refrigerator, a small amount of precipitation was normal. A detection method adopted a detection method in *National Food Safety Standard GB 1886.127-2016 Food Additives Hawthorn Seed Smoking Spices No. I and No. II*. An amended Gibbs method was adopted for detecting a phenol content, and a result was expressed by 2,6-dimethoxyphenol.

A hydroxylamine hydrochloride method was adopted for determining a carbonyl compound. A principle was that a carbonyl group in the carbonyl compound could react with hydroxylamine hydrochloride to produce oxime and water and to release acid at the same time. The produced acid was titrated by 0.100 mol/L of a sodium hydroxide standard solution, and a content of the carbonyl compound could be obtained. Finally, the content of the carbonyl compound was expressed by heptanal.

The reference to a national standard GB 5009.27-2016 of *National Food Safety Standard of Determination of Benzo (a)pyrene in Food* was adopted for determining a content of benzopyrene.

The contents of the phenol, the carbonyl compound and the benzopyrene in the garlic stem fumeol prepared through pyrolysis at different temperatures were as shown in Table 2 below.

TABLE 2

Contents of each component of garlic stem fumeol prepared through pyrolysis at different temperatures

| Raw material | Temperature | Total phenol content (mg/mL) | Carbonyl compound content (g/100 mL) | Benzopyrene content (ug/kg) |
|---|---|---|---|---|
| Garlic stem | 250° C. | 0.549 | 2.172 | 0.25 |
| | 300° C. | 1.419 | 1.658 | 0.36 |
| | 350° C. | 1.433 | 1.370 | 0.37 |

(3) Preparation of garlic stem fumeol of different particle sizes:

After the garlic stems were pulverized, the powder was screened into micro particles with particle sizes being about 3.2 mm, 1.6 mm, 0.8 mm, 0.4 mm and 0.2 mm. The garlic stems with different particle sizes were respectively put into a pyrolysis device for pyrolysis, a pyrolysis temperature was set to be 350° C., and the pyrolysis time was 50 min. Smoke produced during pyrolysis was respectively condensed and collected to obtain a crude fumeol at different temperatures. After the pyrolysis was completed, the obtained crude fumeol was immediately put into a refrigerator being 4° C. to be subjected to still standing for 48 h, so that impurities such as wood tar could be sufficiently separated from the fumeol, and at the same time, by putting the fumeol into the refrigerator, moisture in the fumeol could be prevented from being volatilized. Then, filtration was performed twice by using quantitative filter paper, and a refined garlic stem fumeol was obtained. Other preparation methods and conditions are identical to those of preparation of the garlic stem fumeol at different temperatures.

The prepared garlic stem fumeol was put into a refrigerator being 4° C. to wait for detection. In the process that the garlic stem fumeol was placed in the refrigerator, a small amount of precipitation was normal. A detection method adopted a detection method in *National Food Safety Standard GB 1886.127-2016 Food Additives Hawthorn Seed Smoking Spices No. I and No. II*. An amended Gibbs method was adopted for detecting a phenol content, and a result was expressed by 2,6-dimethoxyphenol.

A hydroxylamine hydrochloride method was adopted for determining a carbonyl compound. A principle was that a carbonyl group in the carbonyl compound could react with hydroxylamine hydrochloride to produce oxime and water and to release acid at the same time. The produced acid was titrated by 0.100 mol/L of a sodium hydroxide standard solution, and a content of the carbonyl compound could be obtained. Finally, the content of the carbonyl compound was expressed by heptanal.

The reference to a national standard GB 5009.27-2016 of *National Food Safety Standard of Determination of Benzo (a)pyrene in Food* was adopted for determining a content of benzopyrene.

The detection results were as shown in Table 3:

TABLE 3

Contents of each component of garlic stem fumeol of different particle sizes

| Garlic stem particle size | Total phenol content (mg/mL) | Carbonyl compound content (g/100 mL) | Benzopyrene content (ug/kg) |
|---|---|---|---|
| 0.2 mm | 1.603 | 2.469 | 0.37 |
| 0.4 mm | 1.188 | 1.065 | 0.32 |

TABLE 3-continued

Contents of each component of garlic stem fumeol of different particle sizes

| Garlic stem particle size | Total phenol content (mg/mL) | Carbonyl compound content (g/100 mL) | Benzopyrene content (ug/kg) |
|---|---|---|---|
| 0.8 mm | 1.433 | 1.370 | 0.37 |
| 1.6 mm | 1.033 | 1.025 | 0.35 |
| 3.2 mm | 1.039 | 1.074 | 0.38 |

The food fumeol can be obtained by blending the dried tangerine peel fumeol and the *Perilla frutescens* fumeol prepared under different conditions, and the dried tangerine peel fumeol and the *Perilla frutescens* fumeol can be mixed and blended at different proportions to prepare the food fumeol having different colors and different flavors.

The food fumeol can be obtained by blending the dried tangerine peel fumeol and the garlic stem fumeol prepared under different conditions, and the dried tangerine peel fumeol and the garlic stem fumeol can be mixed and blended at different proportions to prepare the food fumeol having different colors and different flavors.

The food fumeol can be obtained by blending the garlic steam fumeol and the *Perilla frutescens* fumeol prepared under different conditions, and the garlic stem fumeol and the *Perilla frutescens* fumeol can be mixed and blended at different proportions to prepare the food fumeol having different colors and different flavors.

The food fumeol can be obtained by blending the dried tangerine peel fumeol, the *Perilla frutescens* fumeol and the garlic steam fumeol prepared under different conditions, and the dried tangerine peel fumeol, the *Perilla frutescens* fumeol and the garlic steam fumeol can be mixed and blended at different proportions to prepare the food fumeol having different colors and different flavors.

Different food fumeol can be obtained by blending three different kinds of single fumeol, so that the types of the food fumeol are greatly increased, and smoking food having different colors and flavors is greatly increased.

The above descriptions are merely exemplary implementations of the present invention, and are not all implementations, and the protection scope of the present invention is not limited thereto. For conciseness of description, not all possible combinations of each of technical features of the above embodiments are described. However, these technical features should be considered to be within the scope of the present invention as long as there is no conflict in combinations of these technical features. When there is a conflict in a combination of technical solutions or the technical solution cannot be implemented, it should be considered that such a combination of technical solutions does not exist, and it is not within the protection scope of the present invention. It should be pointed that those skilled in the art and any person familiar to the art will be able to make equivalent substitutions or changes and improvements according to the technical solutions of the present invention and the inventive concept thereof without departing from the spirit of the general inventive concept and the principles of the present invention, and these changes and improvements should also be considered to be within the protection scope of the present invention.

What is claimed is:

1. A method for preparing a food fumeol from *Perilla frutescens* as a raw material, comprising:
    pulverizing the *Perilla frutescens*, which is without mildew, dust or other impurities and used as a raw material, into dry particles with a particle size of 0.2 mm to 1.5 mm,
    putting the *Perilla frutescens* into a blast air oven being 105° C. to be repeatedly dried to reach a constant weight, the constant weight referring to a condition that a difference between two successive weighing results is less than 1 g,
    performing dry distillation on the *Perilla frutescens* at a temperature of 250° C. to 350° C. for 50 min, condensing smoke gas, collecting a crude fumeol, performing low-temperature still standing on the crude fumeol for 24 to 48 h in a refrigerator being 0° C. to 4° C., and performing filtration by using a double-layer quantitative filter paper to obtain a *Perilla frutescens* fumeol; and
    determining that a carbonyl compound, detectable by a hydroxylamine hydrochloride method, is not detected in the *Perilla frutescens* fumeol by using the hydroxylamine hydrochloride method.

2. The method for preparing a food fumeol from *Perilla frutescens* as a raw material according to claim 1, wherein the *Perilla frutescens* is pulverized into dry particles with a particle size of 0.8 mm.

\* \* \* \* \*